United States Patent [19]
Zach

[11] Patent Number: 6,128,993
[45] Date of Patent: Oct. 10, 2000

[54] JIG FOR CUTTING HARDWOOD FLOORING TO EXACT LENGTHS

[76] Inventor: Mark Zach, 1804 McKinley Dr., Northfield, Minn. 55057-3047

[21] Appl. No.: 09/286,412

[22] Filed: Apr. 5, 1999

Related U.S. Application Data

[63] Continuation-in-part of application No. 08/733,654, Oct. 17, 1996, abandoned.

[51] Int. Cl.[7] ........................................................ B26D 7/02
[52] U.S. Cl. ........................ 83/453; 83/522.19; 83/522.25
[58] Field of Search ................................. 83/453, 522.25, 83/452, 522.17, 454, 468, 490, 522.19; 269/249, 307; 33/526, 527, 645

[56] References Cited

U.S. PATENT DOCUMENTS

| | | |
|---|---|---|
| 2,526,626 | 10/1950 | Basso . |
| 2,747,625 | 5/1956 | Small . |
| 3,057,240 | 10/1962 | De Witt . |
| 3,263,544 | 8/1966 | Margolien . |
| 4,236,702 | 12/1980 | Keddie . |
| 4,283,977 | 8/1981 | Batson . |
| 4,745,834 | 5/1988 | Neumann . |
| 4,798,113 | 1/1989 | Viazanko . |
| 5,176,058 | 1/1993 | Skelly . |
| 5,181,326 | 1/1993 | Eberline . |
| 5,197,365 | 3/1993 | Clifton . |
| 5,327,653 | 7/1994 | Pistorius et al. . |

*Primary Examiner*—Kenneth E. Peterson
*Attorney, Agent, or Firm*—Moore & Hansen

[57] ABSTRACT

A jig which allows hardwood flooring or other building material to be cut to an exact length to fit with precision between two fixed pieces of building material. The jig includes a marking member which attaches to a workpiece which is positioned with one end abutted to a fixed piece of building material and the other end extending beyond a second fixed piece of building material. The marking member attaches to the workpiece in such a way that it is secured in a precise position relative to the second fixed piece of building material. The jig also includes a receiving member which is affixed to a cutting device. The marking member, when aligned with the receiving member, serves as a saw guide that allows consistent cuts to be made so that the workpiece will fit with precision between the two fixed pieces of building material.

8 Claims, 7 Drawing Sheets

JIG FOR CUTTING HARDWOOD FLOORING TO EXACT LENGTHS

This is a continuation-in-part of application Ser. No. 08/733,654, filed Oct. 17, 1996, now abandoned.

BACKGROUND OF THE INVENTION

1. Field of the Invention

This invention relates to the cutting of hardwood flooring, specifically a jig used in combination with a miter saw to cut precise lengths to fit between two headers.

2. Description of the Prior Art

The laying of hardwood floors is a labor intensive manual process. In the past, borders and other interesting features were often included in a hardwood floor design. These designs often involved laying flooring between two fixed headers. Both ends of the flooring pieces are exposed and the pieces must be cut for a tight fit. Many newer hardwood floors have a fit between the headers and the flooring that is uneven and irregular because installers can no longer afford to take the time necessary to achieve a good fit. Flooring is now often laid from wall to wall, with baseboards eventually covering the unevenly cut ends of the flooring. Today's housing market, with its high demand for unique details and for hardwood floors creates a need for a less tedious method to precisely cut flooring to fit between two headers.

The usual process for fitting flooring between two headers begins with the headers fastened in place. The installer begins by butting one end of a piece of flooring against one of the headers and against the previously laid course. The piece is then nailed in place. The installer continues laying flooring in that course, butting each piece against the end of the previous piece, working toward the opposite header. The last piece of flooring in the course must then be accurately cut to length.

Cutting the last piece in a course requires many steps. The installer lays the piece of flooring in place, one end butted against the previous piece and the other end laying on top of the second header. Then, very carefully, the place where the piece should be cut is marked with a pencil. The board is then cut off, often using a miter saw, and tried in place to see how it fits. Due to lack of precision in this method, boards often are cut more than once, in a trial and error process to achieve a precise fit. If a board is cut too short, there is a gap between the board and the header. If a board is left too long and forced into place, it tends to force the headers apart and create a gap at the end of the boards previously laid.

Shortcomings of this process include the following. The flooring strip to be cut lays at an angle to horizontal, making a precise mark difficult. The pencil mark width may change over time as the pencil lead is worn down. The mark is visually aligned with the saw blade to make the cut. The piece is then tried in place and often must be recut. This trial and error method takes a lot of time, as pieces are visually aligned, cut, tried and recut. Small imprecisions result in an imperfect fit. This process is a very labor intensive and therefor costly.

There are a variety of saw guides available that facilitate accurate cutting of building material at a predetermined place. This jig is used to determine the place of the cut to allow for a precise fit, in addition to facilitating an accurate cut.

OBJECTS AND ADVANTAGES

Accordingly, several objects and advantages of the jig for cutting hardwood flooring to exact lengths are:

(a) to provide jig that eliminates the inconsistent fit produced by the prior art;

(b) to provide a jig that eliminates the time-consuming trial and error method, and therefor save time and money;

(c) to provide a jig that eliminates the need for aligning visually the location on the flooring strip where the cut is to be made;

(d) to provide a jig that eliminates the need for marking the flooring with a pencil, which may result in imprecision in the dimension or placement of the mark;

(e) to provide a jig that eliminates the need for visually aligning the location at which the saw blade will cut the flooring strip;

(f) to provide a jig that allows the user to make precise cuts while keeping face and hands at safer distances form the saw blade than may be the case with the prior art;

(g) to provide a jig that allows a precise fit to be made with ease, even by less experienced installers;

Further objects and advantages of my invention will become apparent from a consideration of the drawings and ensuing description.

REFERENCE NUMERALS IN DRAWINGS

10 Jig
12 Jig Base
14 Jig Top
16 Jig Pin
18 Jig Screw
19 Jig Screw Washer
20 Locating Strip
22 Locating Pin 24 Locating Strip Screws
26 Flooring Strip Being Fit/Cut
28 Header
30 Previous Flooring Strip
32 Area of Flooring already Laid
34 Miter Saw Base
36 Miter Saw Blade
38 Jig Stop
40 Jig Stop Pin
42 Jig Stop Screw
44 Jig Stop Registration Means
46 Jig Body Registration Means

SUMMARY

This jig allows a miter saw to cut each piece of hardwood flooring to a precise length in one cut. A flooring strip, inserted into the clamp body, is butted against the previous strip. The locating strip, attached to the clamp body, butts against the [opposing] header. The clamp top is tightened to hold the flooring strip in place, within the jig. The jig, with the flooring strip clamped inside of it, is placed on the miter saw base and butted against a provided stop. The saw will then cut the flooring strip in the desired location.

DETAILED DESCRIPTION OF THE INVENTION

Figure 1:
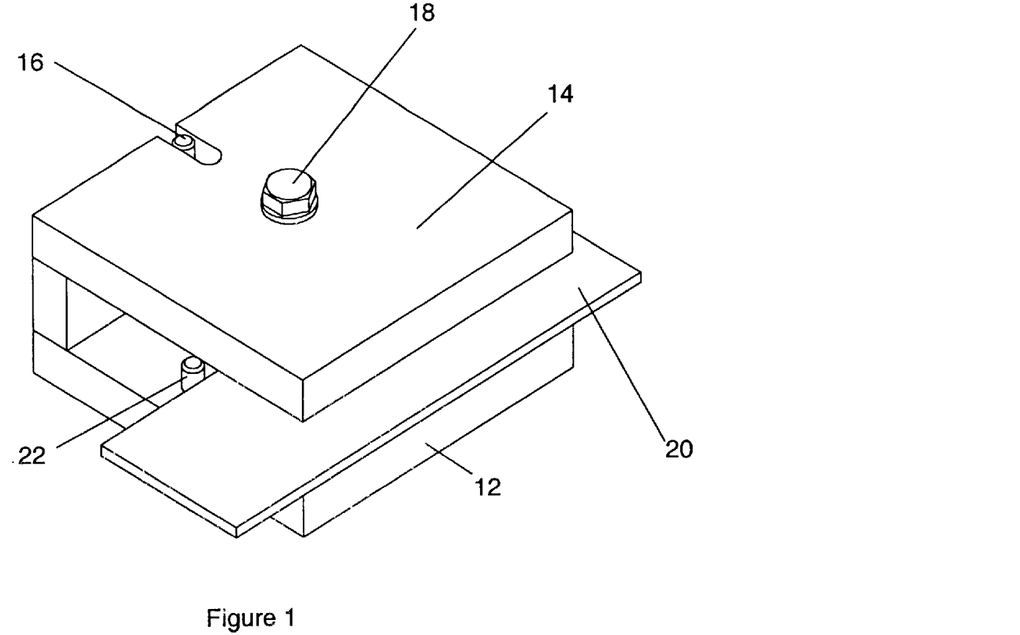
FIG. 1 is a perspective view of a jig, in accordance with one embodiment of this invention.
Figure 2:
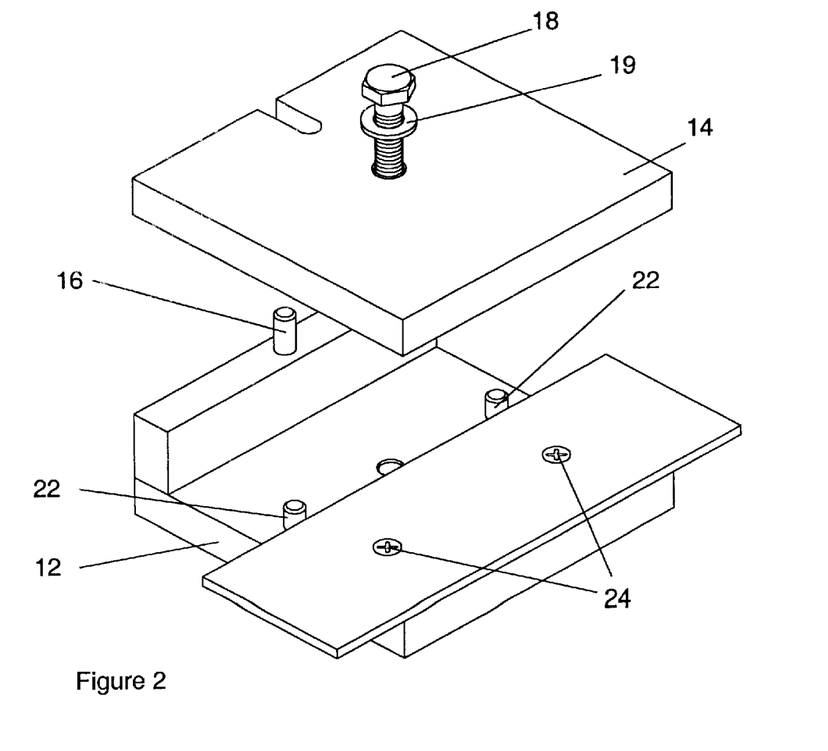
FIG. 2 is an exploded view of a jig.

A typical embodiment of the jig is illustrated in perspective in FIG. 1 and in an exploded view in FIG. 2. A jig consists of a jig base 12 and a jig top 14. A jig pin 16 aligns the jig top with the jig base. A jig screw 18 with washer 19 secures the jig top to the jig base. Locating pins 22 protrude from the jig base. A locating strip 20, made of a wear-resistant, easily cut material such as sheet acrylic, is attached to the jib base with screws 24.

Figure 3:
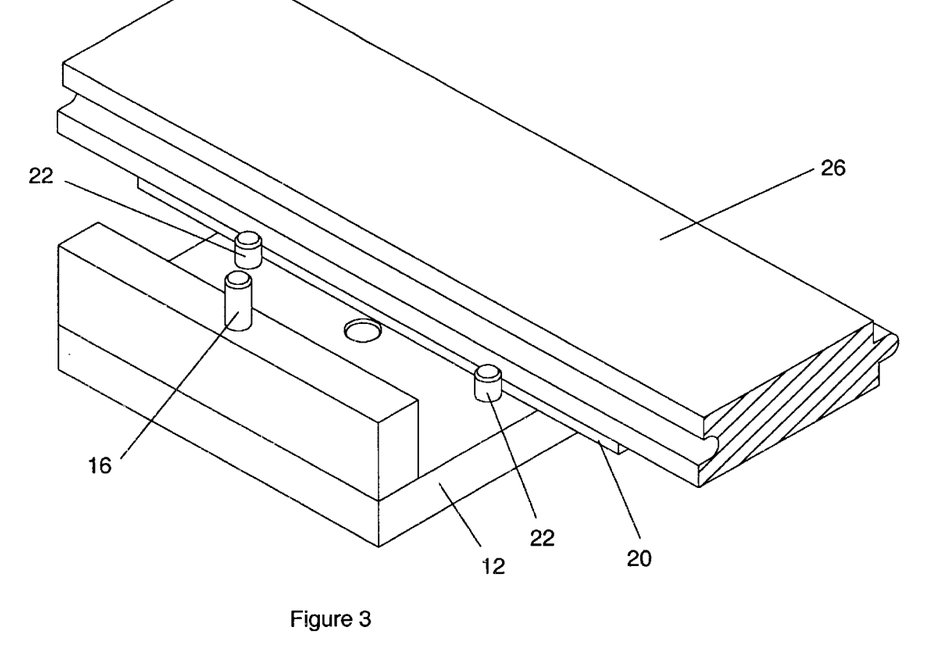
FIG. 3 is a perspective view of a jig base with a flooring strip in place.
Figure 4:
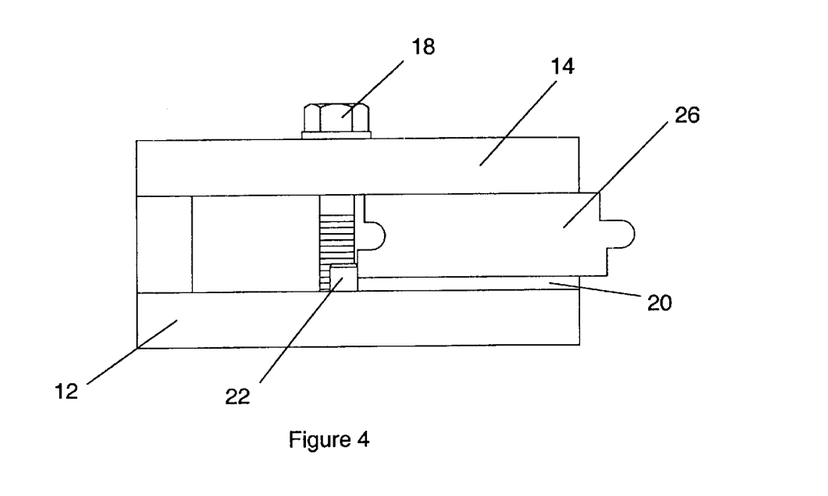
FIG. 4 is an end view of a jig with a flooring strip in place.

FIG. 3 is a perspective view showing jig base 12 with a flooring strip 26 in place on locating strip 20 and against locating pins 22. FIG. 4 shows an end view of the flooring strip on the jig base with jig top 14 secured in place by jig screw 18.

Figure 5:
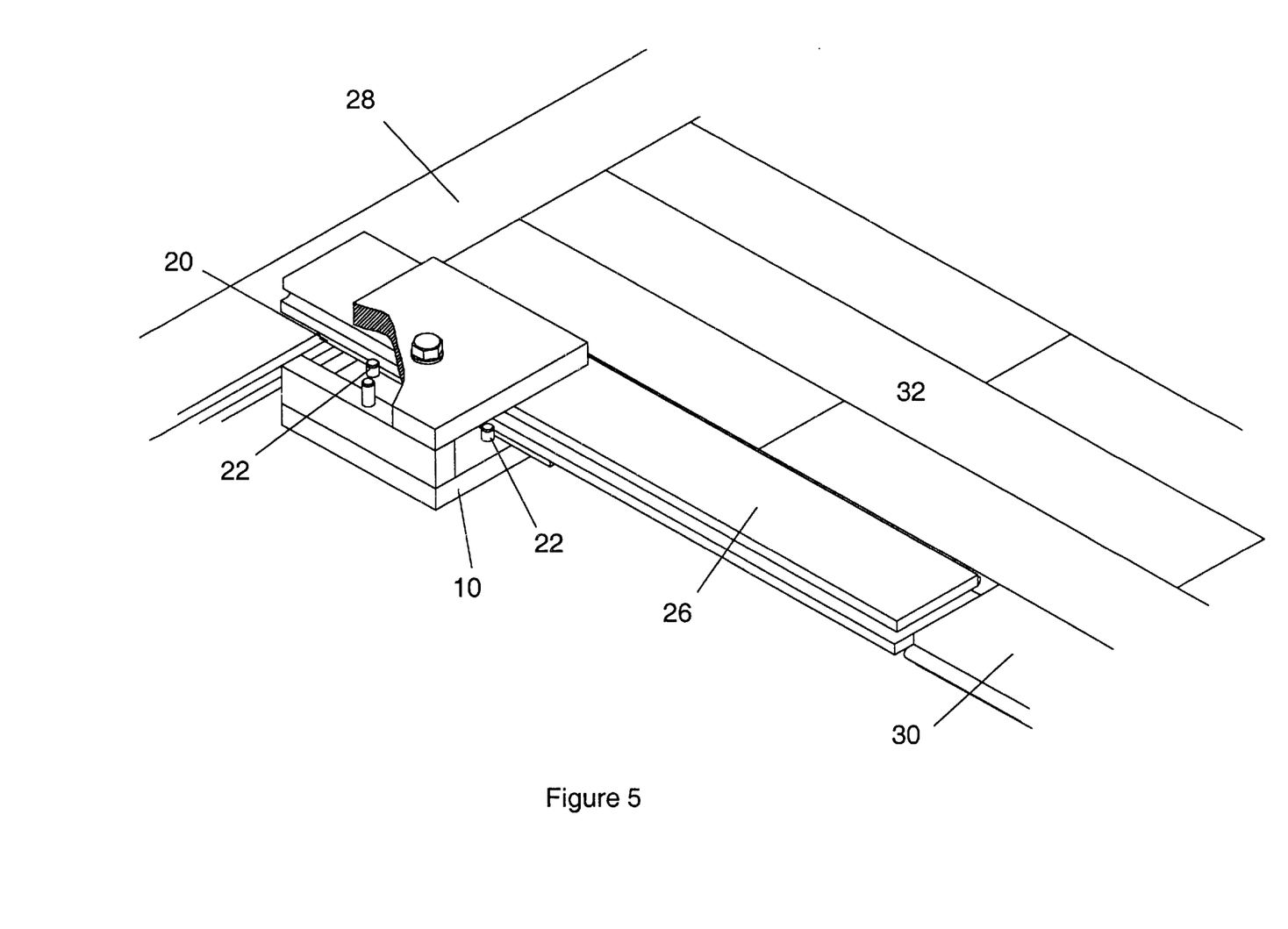
FIG. 5 is a perspective view of a jig with a flooring strip in place, in use between a previously laid strip and a header.
Figure 6:
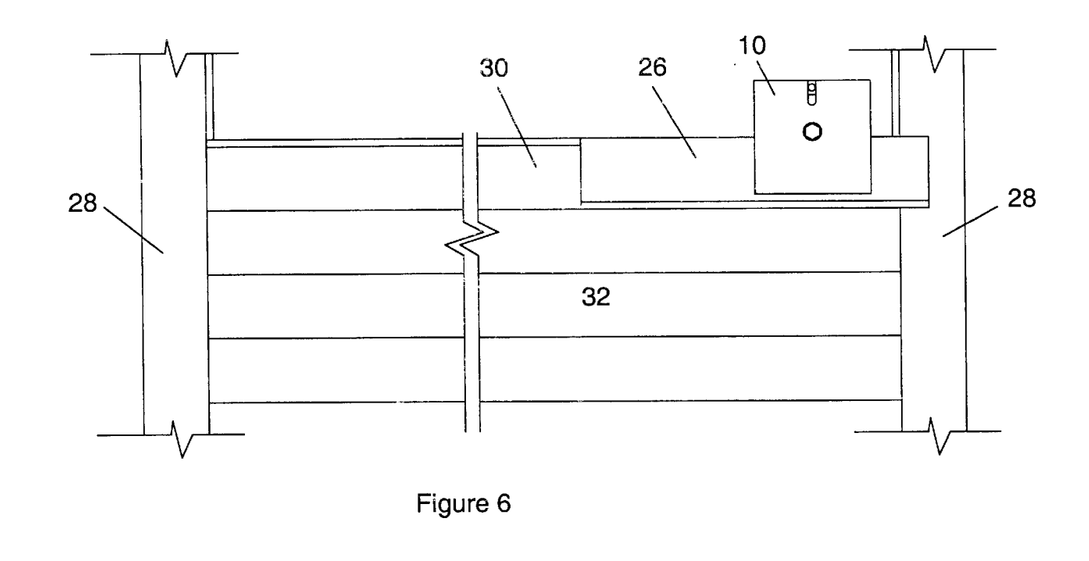
FIG. 6 is a top view of a jig with a flooring strip in place, in use between a previously laid strip and a header.
Figure 7:
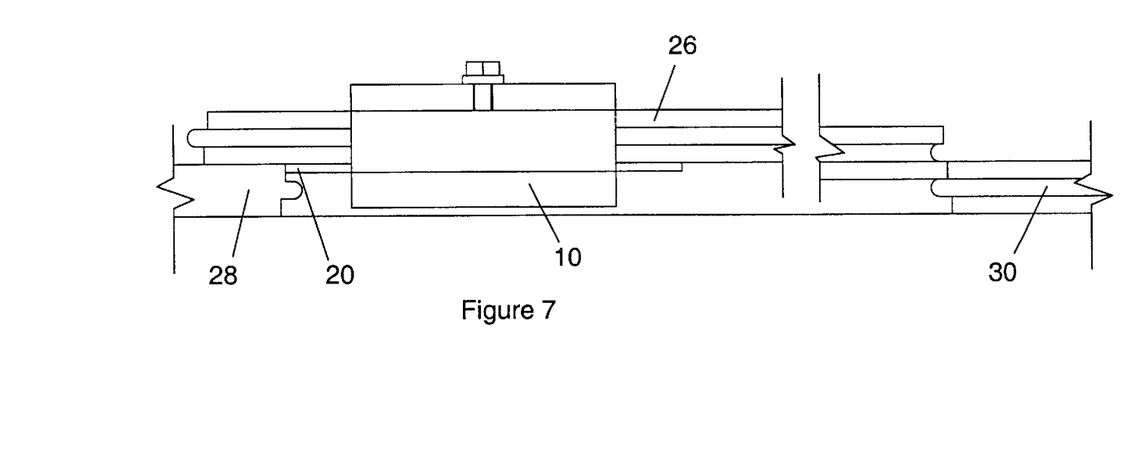
FIG. 7 is a rear view of a jig with a flooring strip in place, in use between a previous laid strip and a header.

FIG. 5, FIG. 6 and FIG. 7 are perspective, top and rear views of jig 10 in use to fit flooring strip 26. The flooring strip is next to an area of flooring already laid 32, with one end abutting a previous flooring strip 30. The other end of the flooring strip is resting on a header 28. Locating strip 20 under the flooring strip is against the header.

Figure 8:
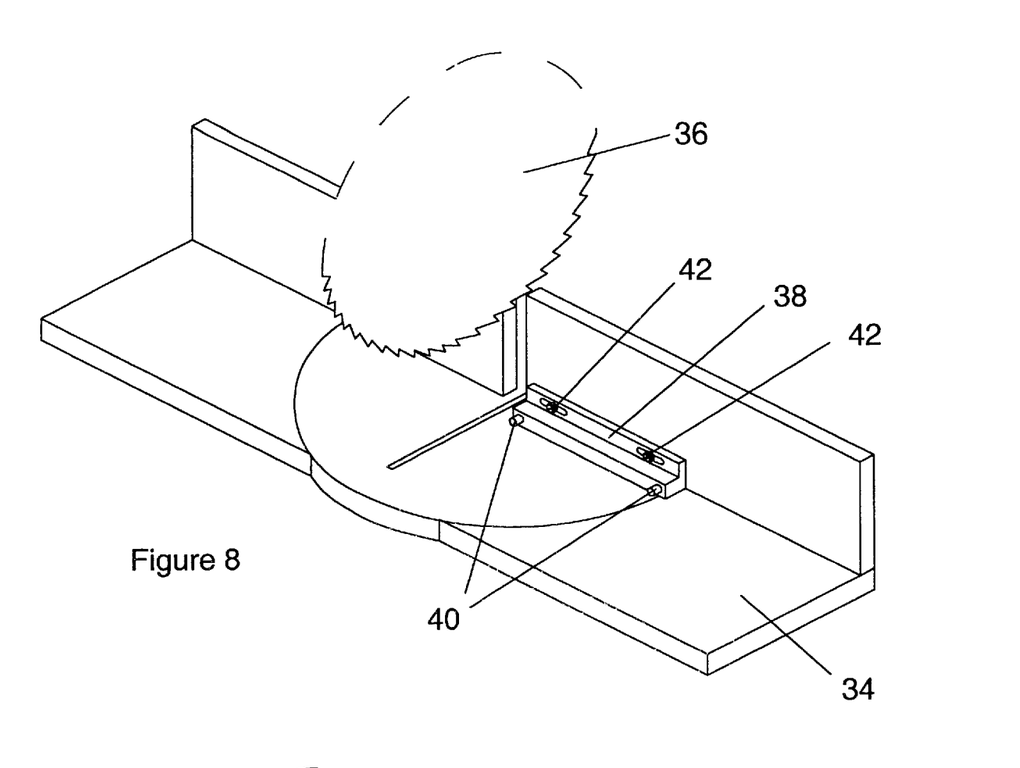
FIG. 8 is a perspective view of a miter saw base and blade, with stop attached.
Figure 9:
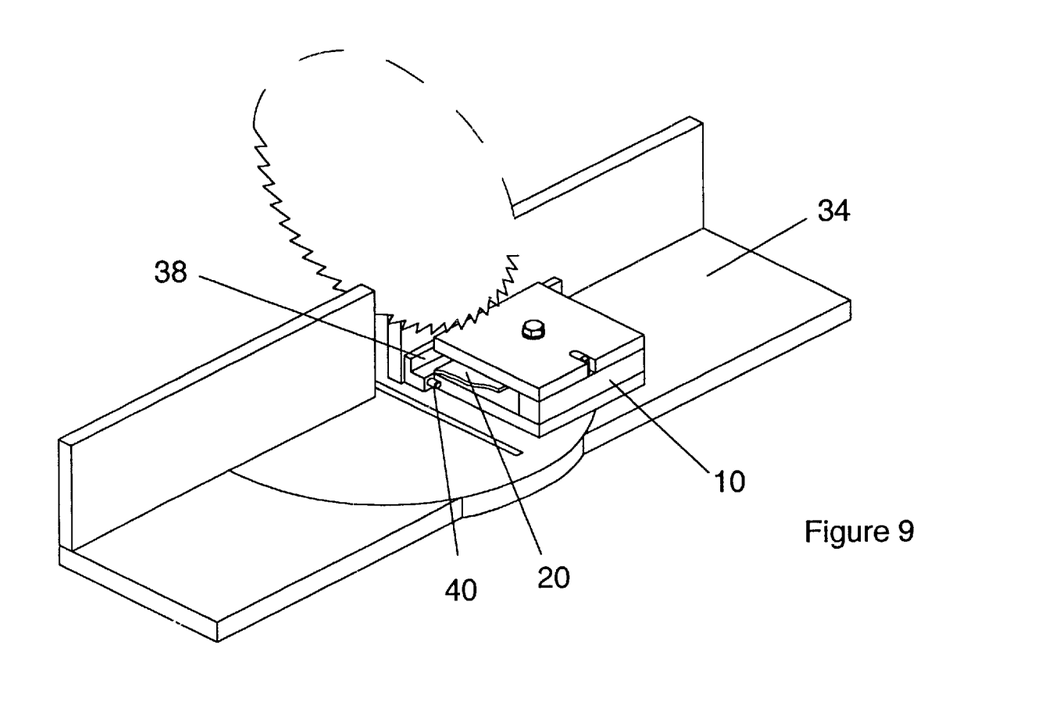
FIG. 9 is a perspective view of a jig in place against a stop on a miter saw base.

FIG. 8 shows a generic miter saw base 34 and a miter saw blade 36. A jig stop 38 is attached to the miter saw base with a pair of jig stop screws 42. Two jig stop pins 40 protrude from the jig stop. FIG. 9 shows jig 10 in place on the miter saw base, against the jig stop and the jib pin nearest the saw blade.

Figure 10:
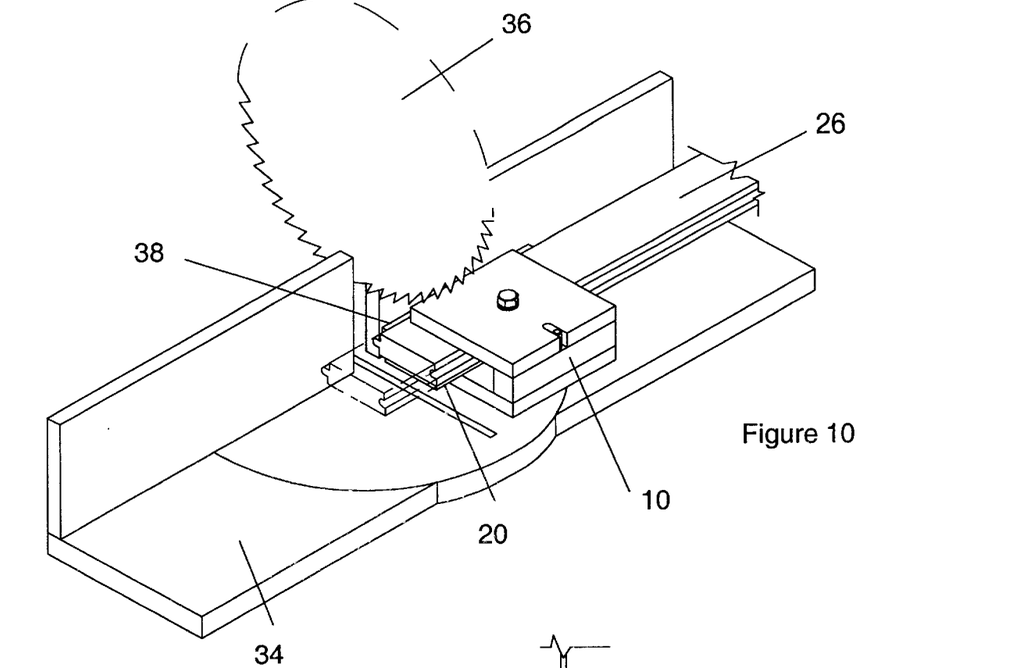
FIG. 10 is a perspective view of a jig holding a flooring strip in cutting position on a miter saw base.
Figure 11:
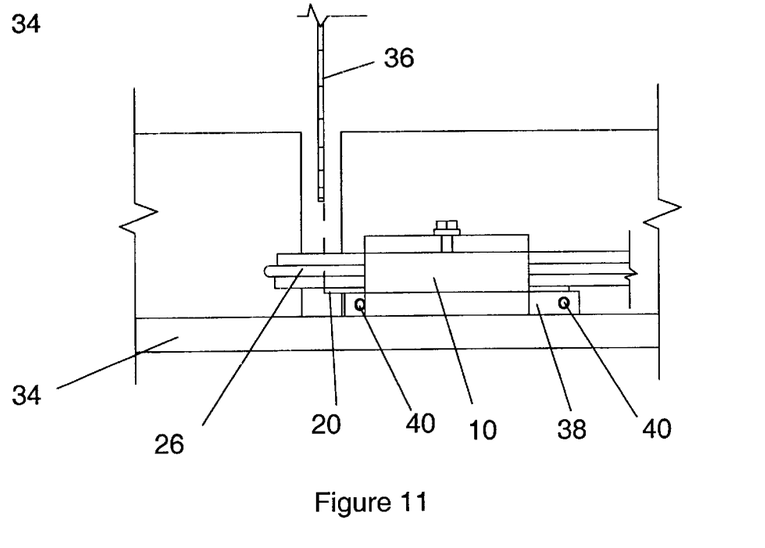
FIG. 11 is a rear view of a jig holding a flooring strip in cutting position on a miter saw base.

FIG. 10 and FIG. 11 show a perspective view and a rear view of jig 10 with flooring strip 26 secured in place. The jig is on miter saw base 34, against jig stop 38 and jig pin 40 nearer saw blade 36. The end of locating strip 20 is aligned with the edge of miter saw blade 36.

Figure 12:
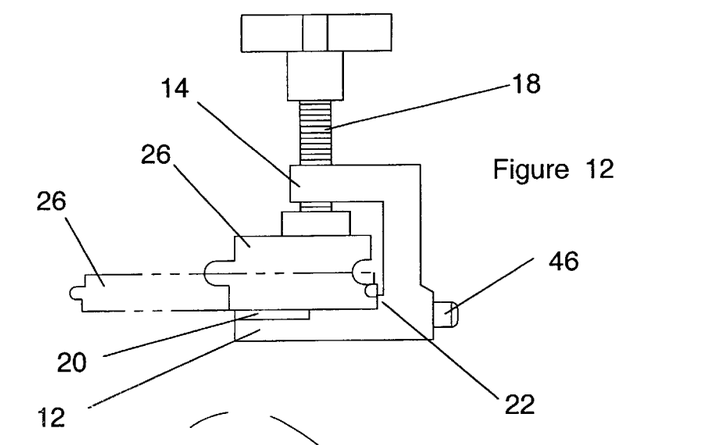
FIG. 12 is a side elevational view of a preferred embodiment of the present invention illustrating how a workpiece is secured within the jig body.

FIG. 12 shows a side elevational view of the preferred embodiment of the jig body 10 having a workpiece 26 secured therein by means of a jig screw 18.

Figure 13:
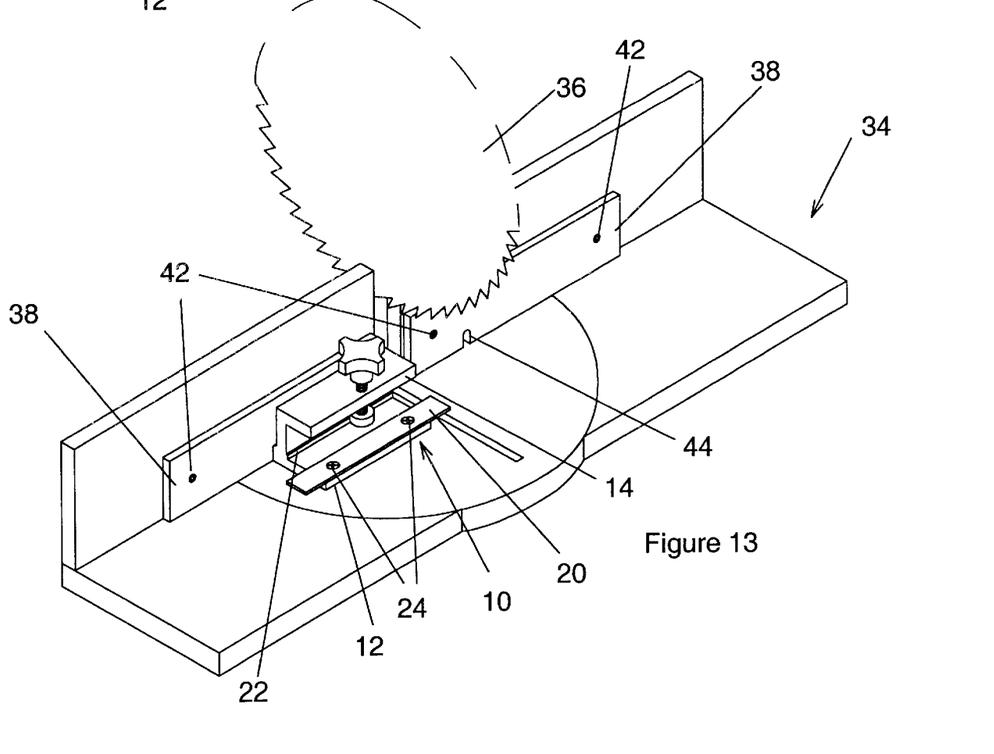
FIG. 13 is a perspective view of the jig body arranged upon the base of a saw, also showing the stop member of the present invention secured to the base of the saw.

FIG. 13 illustrates how the jig body 10 is received upon the saw base 34 in registration with the saw blade 36 as dictated by the position of the jig stop registration means 44 formed in the jig stop member 38. FIG. 13 also shows how the preferred embodiment of the ht jig stop or stop member 38 is typically secured to a saw base 34.

OPERATION OF THE INVENTION

Operation—FIGS. 8, 9

A jig stop 38 is attached to miter saw base 34 in a position such that when a jig 10 is placed against the jig stop and a jig stop pin 40 nearest to a miter saw blade 36, a locating strip 20 extends slightly beyond the cutting plane. The miter saw blade is then brought down to cut off the locating strip, calibrating the jig with the miter saw blade. (The locating strip, made of sheet acrylic in this embodiment, is a replaceable part.)

Operation—FIGS. 4 to 7

The method by which jig 10 is used will now be described. A tongue and groove flooring strip 26 is laid finished side down, with its groove end tight against the end and resting on the tongue of a previous board 30 and its tongue end resting on a header 28. The jig is placed so that the flooring strip rest son locating strip 20 and against the two locating pins 22. The jig is then pushed along the flooring strip so that the locating strip is firmly against the header, above its tongue. A jig screw 18 is tightened to hold a jig top 14 firmly against the flooring strip.

Operation—FIGS. 10, 11

As described above, jig stop 38 has previously been attached to miter saw base 34 and calibrated. Jig 10 holding flooring strip 26 is placed on the miter saw base and pushed firmly against the jig stop and jig stop pin 40 nearest to miter saw blade 36. The miter saw blade is then brought down, cutting the flooring strip precisely at the end of locating strip 20. The flooring strip is then removed from the jig. (A groove must then be cut into the cut end of the flooring strip so that it can be inserted between previous board 30 and header 28.)

An improved and preferred embodiment of the workpiece cutting jig of the present invention is illustrated in FIGS. 12 and 13. The jig body or clamping body 10 of the preferred embodiment is a solid extruded channel. The space or channel between the top 14 and the base 12 of the clamping body is sized to receive variously sized workpieces 26. The extrusion is preferably of an aluminum material, however, steel, plastics or other suitable composite materials may be utilized. Use of an extruded channel simplifies the assembly of the jig body 10.

The locating pins 22 of the above-described alternate embodiment of the present invention are, in this preferred embodiment, replaced with a continuous locating ridge 22. A workpiece 26 is inserted between the base 12 and top 14 of the jig body 10 and is aligned therebetween by the locating ridge 22 which abuts the workpiece 26 along the entire length of the jig body 10. The workpiece 26 is secured within the jig body 10 by use of a workpiece retention means 18, which may be a jig screw as described above. Alternatively, the workpiece retention means 18 may comprise an eccentric clamp or other spring clamp device. A locating strip 20 is secured to the base 12 of the jig body 10 and is used to align a workpiece 26 within the jig body 1 in order to cut a workpiece to a desired length as described above.

The means for registering the jig body 10, and hence the workpiece, with the saw blade 36 have been modified to allow the saw to be utilized for cutting operations unrelated to the installation of flooring. Using the jig stop member 38 illustrated in FIG. 13, a saw that is being used to cut workpieces 26 may also be used to cut other items without first needing to remove the stop member 38 from the saw base 34. As illustrated in FIG. 13, the jig stop member 38 may comprise an auxiliary fence that is secured to the saw base 34 by screws or other fasteners 42.

In this preferred embodiment, the jig body 10 has been provided with jig body registration means 46 which may comprise one or more pins that protrude or project from the rear surface of the jig body 10 (FIG. 13). These jig body registration means 46 are arranged and constructed to mate with the jig stop registration means 44 formed in the jig stop member 38 so as to repeatably and reliably register the jig body 10 with the saw blade 36 in a predetermined manner as described above. The jig stop registration means 4 may comprise one or more apertures or detents formed into the jig stop 38 so as to receive the jig body registration means 46. In some instances, where the saw base 34 itself is provided with apertures, holes, or detents of a type suitable for receiving jig body registration means 46 such as the above described pins, the stop member 38 may be omitted as the saw base 34 itself may act as the stop member 38.

It is to be understood that the jig stop registration means 4 which may variously comprise holes, apertures, detents and the like, and the jig body registration means 46, which may variously comprise pins, protrusions, or similar structures, are interchangeable. Subsequently, pins or protrusions may be formed on the jig stop member 38 and mating holes, apertures, or detents may be formed in the jig body 10 and vice versa. The only structural requirement is that the jig body 10 be repeatably and reliably registratable with the saw blade 36 of a saw so as to be able to cut a workpiece 26 in an accurate and repeatable manner.

It is also to be understood that the present invention may be adapted for use with a number of different types of saws and cutting devices without exceeding the scope of the appended claims. The various embodiments of the present invention may be modified for use with commonly available miter saws (powered and hand operated), radial arm saws, and chop saws. The present invention may also be modified for use with a table saw. Where the workpiece cutting apparatus is to be used with a standard table saw, the jig body registration member 46 would be arranged and constructed to take advantage of the miter gage slots formed into the table saw top 34 so as to register the jig body 10 with the table saw blade 36.

CONCLUSION, RAMIFICATIONS AND SCOPE

Accordingly, the reader will see that the jig of this invention can be used to cut hardwood flooring to fit between two headers easily and conveniently. The ease of use of the invention allows a professional floor installer or a do-it-yourselfer to accurately lay an interesting floor. This highly reliable tool will allow borders and other interesting patterns to be laid in significantly less time than previous methods, reducing the expense and tedium of trial and error methods as well as improving the precision of the fit. Furthermore, the invention has the additional advantages in that

- it allows the installer to precisely measure the board without having to mark it with a pencil, therefore saving time and eliminating any variation in the dimension or placement of the mark;
- it allows the installer to precisely cut the board while keeping face and hands at safer distances from the saw blade than may be the case if visually aligning a pencil mark on a board;
- it eliminates the time-consuming trial and error method, and the inconsistency that can result from repeated cutting of flooring strips using manual marking and cutting methods;

While the description above contains many specificities, these should not be construed as limitations on the scope of the invention, but rather as an exemplification of one preferred embodiment thereof. Many other variations are possible. For example, the type of saw or cutting device may vary, and thus the type of jig stop may vary to fit the saw. The jig top may be aligned with the jig base using a method other than an alignment pin. The locating strip may be replaced by another locating element such as a pin, serving the same function. The jig may be applied to precisely cutting other building materials in appropriate applications.

What is claimed is:

1. A portable apparatus for measuring a workpiece for cutting by a saw having a blade and a saw base, the apparatus comprising:

a clamping body attachable to the workpiece, said clamping body comprising a base, a top, and clamping mechanism for removably securing the workpiece between said base and said top;

an easily cut-able locating element having an end, said locating element attached to and extending from said base a predetermined distance; and a stop member attachable to the saw base, said stop member having means for positioning said clamping body on the saw base so as to allow the blade of the saw to cut the workpiece at said end of said locating element.

2. A portable apparatus for measuring a workpiece as described in claim 1, wherein said locating element is wear resistant.

3. A portable apparatus for measuring a workpiece as described in claim 1, wherein said locating element is sheet acrylic.

4. A portable apparatus for measuring a workpiece as described in claim 1, wherein said means for positioning is a stop pin against which said clamping body abuts.

5. A portable apparatus for measuring a workpiece as described in claim 4, wherein:

said stop member comprises an aperture formed in said saw base; and said clamping body further comprises a protruding extension which engages said aperture to allow the clamping body to be engaged with the stop member so as to allow the saw to cut the workpiece.

6. A portable apparatus for measuring and cutting a free workpiece by a saw having a saw blade and a saw base, said apparatus comprising:

a clamping body attachable to the workpiece at a location remote from said saw blade and saw base, said clamping body comprising a base, a top, and means for slidably, removably securing the free workpiece between said base and said top;

an easily cut-able locating element having an end, said locating element being attached to an extending from said base, said locating element abuttable against one of the fixed workpieces and positioned so as to removably secure the free workpiece to allow the saw to cut the free workpiece at the end of said locating element; and a stop means constructed and arranged for positioning said clamping body on said saw base so as to allow a blade of the saw to cut the free workpiece at said end of said locating element.

7. A portable apparatus for measuring a workpiece for cutting by a saw having a blade and a base, the apparatus comprising:

a clamping body attachable to the workpiece at a location remote from said saw blade and saw base, to removably secure the workpiece in said clamping body;

an easily cut-able locating element having an end, said locating element being attached to and extending from said clamping body a predetermined distance; and, a stop member removably attachable to the saw base, said stop member engageable with said clamping body so as to align and position said clamping body upon the saw base to allow the saw blade to cut the workpiece at said end of said locating element.

8. An apparatus for measuring a workpiece as described in claim 7 wherein:

said stop member further comprises at least one stop member registration means, and said clamping body further comprises at least one jig body registration means, said jig body registration means being arranged and constructed to mate with said stop member registration means so as to register said workpiece secured in said clamping body in a predetermined relation to said saw blade.

* * * * *